July 6, 1954

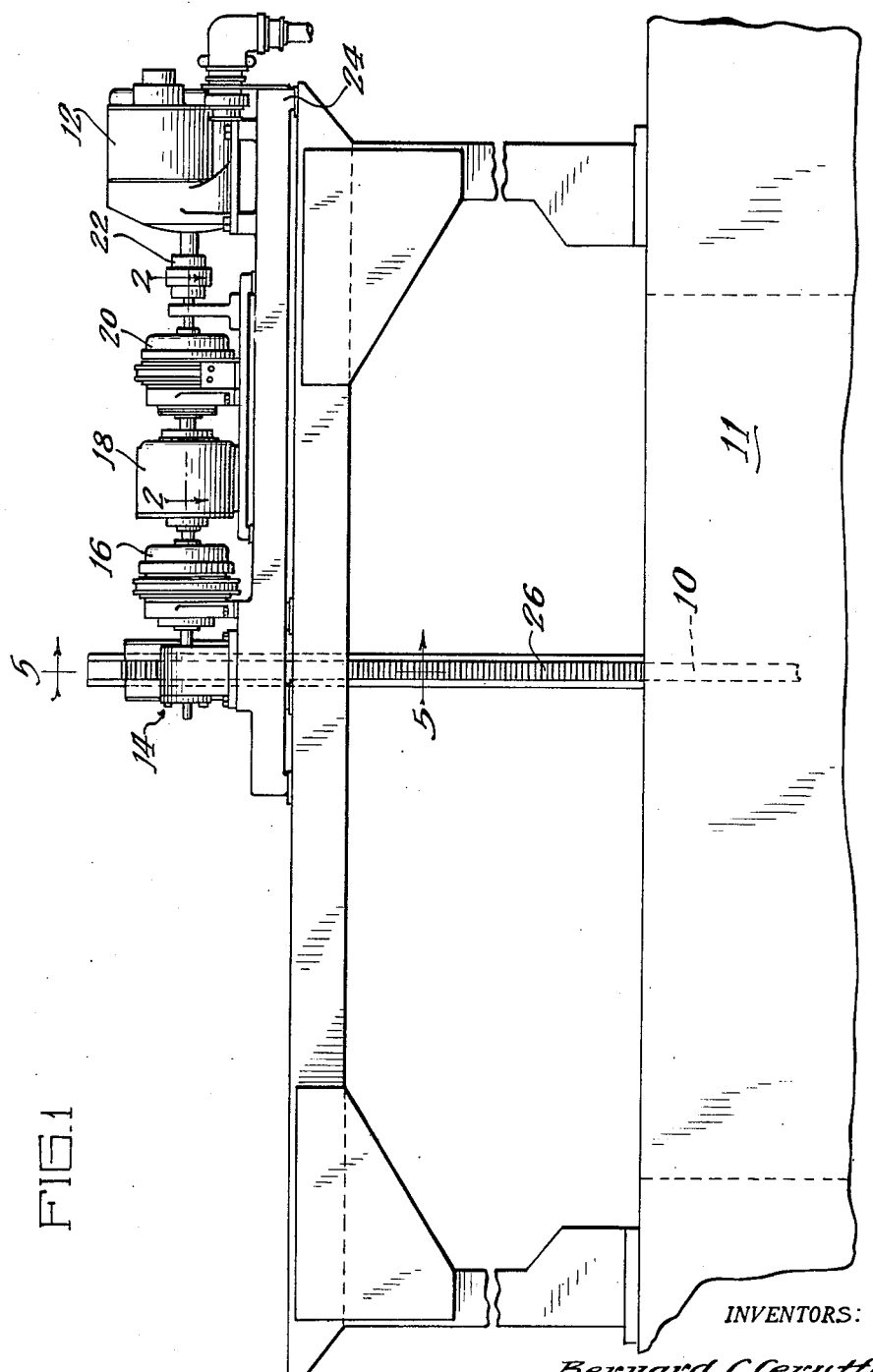

B. C. CERUTTI ET AL 2,682,785

CONTROL ROD DRIVE MECHANISM

Filed July 25, 1951

INVENTORS:
Bernard C. Cerutti
Harold V. Lichtenberger
By: Roland A. Anderson
Attorney:

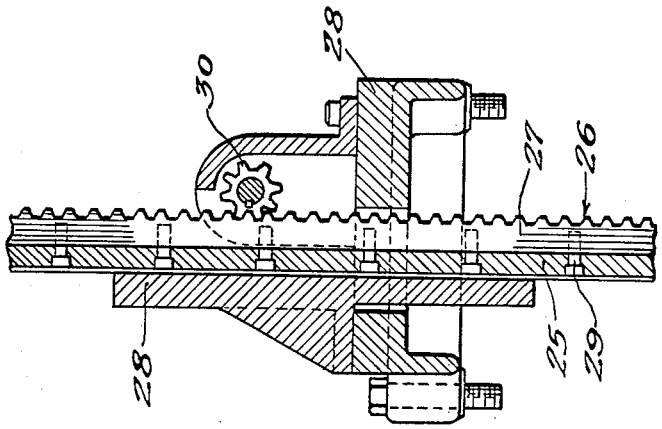
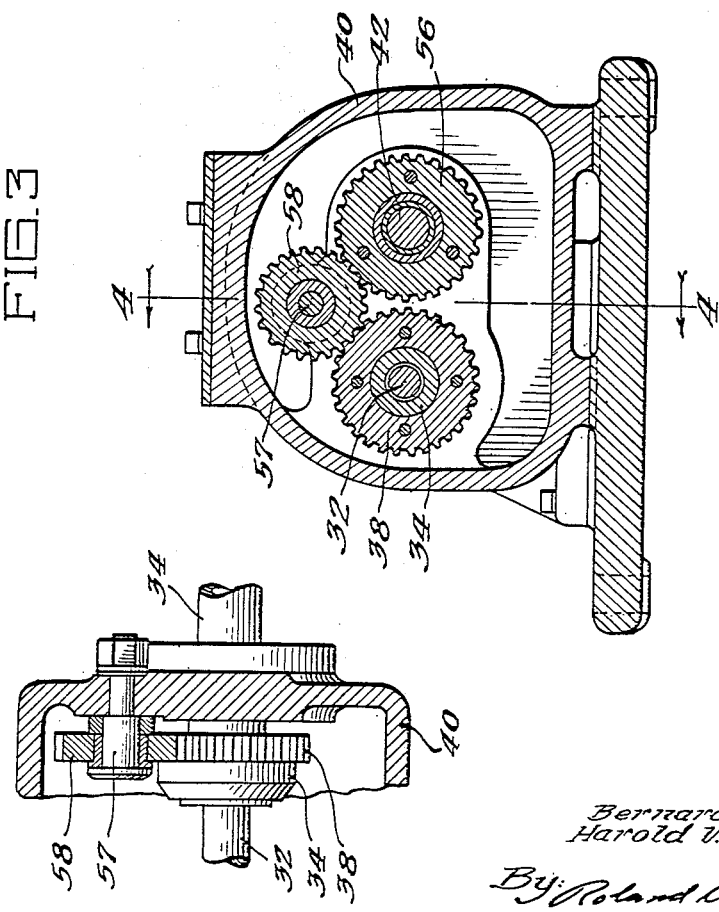

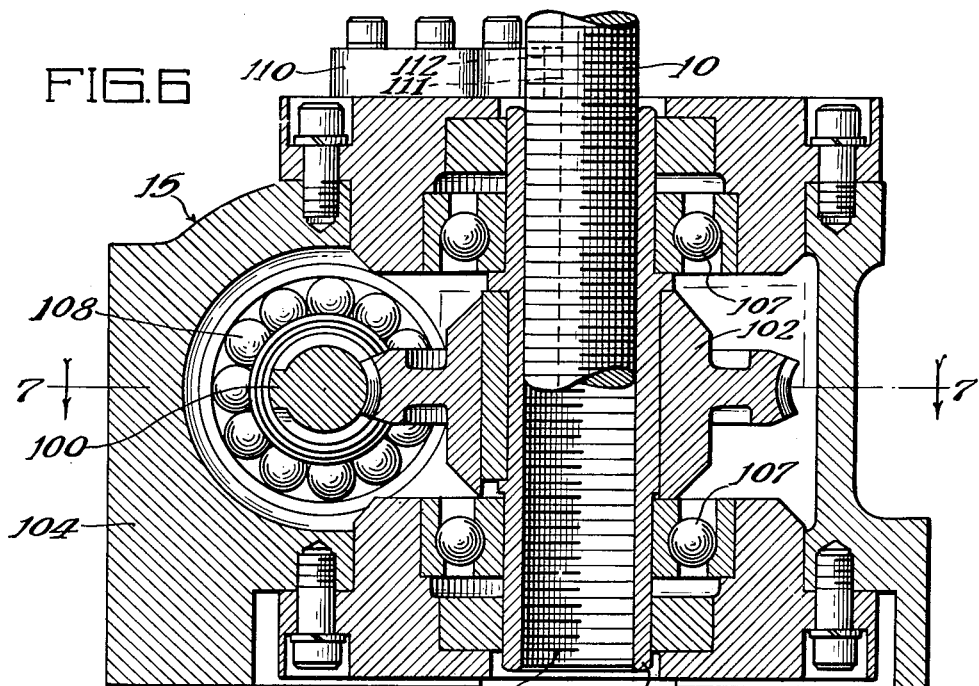
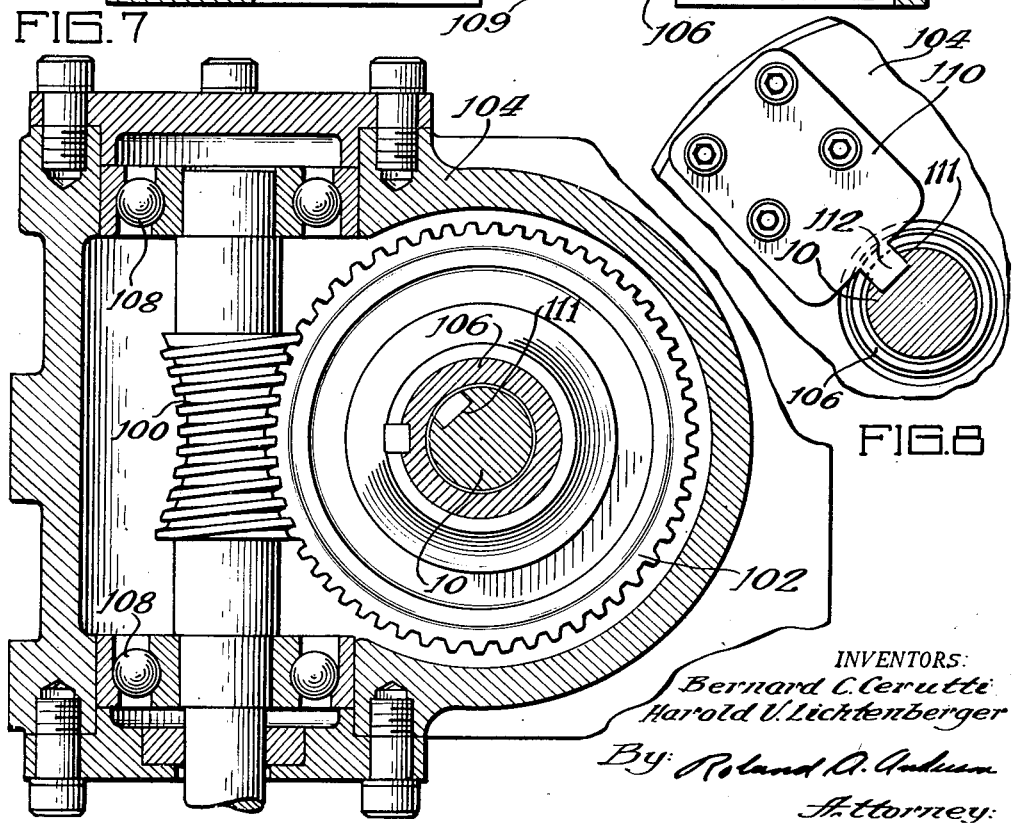

Patented July 6, 1954

2,682,785

UNITED STATES PATENT OFFICE 2,682,785

CONTROL ROD DRIVE MECHANISM

Bernard C. Cerutti and Harold V. Lichtenberger, Idaho Falls, Idaho, assignors to the United States of America as represented by the United States Atomic Energy Commission Application July 25, 1951, Serial No. 238,479

1 Claim. (Cl. 74—674)

The present invention relates generally to a device for positioning an object, and more particularly it relates to a device for inserting and withdrawing a control element in a neutronic reactor.

In general, neutronic reactors are controlled by positioning a control element in the active portion of the reactor, so that the control element may be used to limit the neutron flux density within the reactor. The neutron flux density can be limited either by means of increasing the amount of absorber present in the reactor, changing the amount of neutron moderator within the reactor, or decreasing the amount of thermal neutron fissionable material therein. Regardless of the neutronic element used to achieve control of the reaction, a positioning device is required to accurately control the movements of the control element within the active portion of the reactor. The embodiment of the present invention will be described with reference to positioning a control element containing material that is highly absorbent for thermal neutrons within the active portion of the reactor, although it is understood that the invention may be practiced with the other two general methods of control mentioned above equally well.

Whichever method of controlling the neutronic chain reaction is utilized, it is necessary that the control element be accurately positioned in the direction increasing the reaction, which in general requires a positioning device which moves the control element very slowly in that direction. However, in the event that the reaction exceeds permissible limits, it must be possible to move at least some of the control elements in the opposite direction exceedingly rapidly in order to minimize the danger of an explosive neutronic reaction. Because such a control element is designed to provide safety from explosive reactions, it has been termed a safety control element, while a control element is used to indicate an element which may only be moved slowly to correct for small changes in the reactivity of a neutronic reactor only. Most of the devices presently known in the art for accurately positioning an object cannot be operated to also rapidly move the object so they are not suitable for positioning safety elements. For this reason, it is an object of the present invention to provide a positioning device which will accurately position an object in one direction and rapidly move the object in the other direction.

Explosive neutronic reactions develop very rapidly, and are apt to be a result of positioning the control or safety element too far in the direction of increased reaction. Hence, it is another object of the present invention to provide a device for moving an object accurately in one direction which may be quickly reversed in direction.

It is also an object of the present invention to provide a device for accurately positioning a control element in either direction.

In addition, the device accomplishing these objects must be designed to prevent failures, since an explosive neutronic reaction would cause considerable damage to both equipment and operating personnel. Other objects and advantages will also be readily apparent to the man skilled in the art upon a reading of the following description, especially taken in the light of the drawings, in which:

Figure 1 is an elevational view of one embodiment of the present invention;

Figure 2 is a horizontal sectional view taken along line 2—2 of Figure 1;

Figure 3 is a vertical sectional view taken along line 3—3 of Figure 2;

Figure 4 is a vertical sectional view taken along line 4—4 of Figure 3;

Figure 5 is a vertical sectional view taken along line 5—5 of Figure 1 showing in particular a rack and pinion assembly for coupling the driving force to the control element;

Figure 6 is a vertical sectional view of a worm gear assembly which may be substituted for the rack and pinion assembly shown particularly in Figure 5;

Figure 7 is a sectional view of the worm gear assembly taken along line 7—7 of Figure 6; and Figure 8 is a fragmentary plan view of the worm gear assembly showing the control element in section.

Figure 1 shows generally the various parts of the embodiment illustrated in the drawings and their relationship. Power for positioning a control of safety element 10 of a neutronic reactor 11, here a neutron absorbing element in the form of a rod material that absorbs thermal neutrons, such as boron steel, is supplied by a motor 12. A rack and pinion assembly 14 transforms the rotational motion to a reciprocating motion. An alternate for the rack and pinion assembly 14 is a worm gear assembly 15 shown in Figures 6 through 8. The rack and pinion assembly 14 is coupled to the motor 12 through a first electromagnetic clutch 16, a differential gear mechanism 18, a second electromagnetic clutch 20, and a universal joint 22; and all of these elements being mounted upon a mounting platform 24.

The first electromagnetic clutch 16 is connected to the same electrical power source as the electric motor 12, so that energizing the electric motor 12 also energizes the first electromagnetic clutch 16 and couples the motor 12 to the control element 10. Hence, when the electric motor 12 is deenergized, the first electromagnetic clutch 16 is also deenergized and operates as a brake by coupling the rack and pinion assembly 14 to the mounting platform 24, thus preventing overshoot in positioning the control element 10.

The rack and pinion assembly 14 is most clearly shown in Figure 5, and consists of a rack 26 which is slidably mounted upon a support 28 and keyed thereto. The rack 26 has a slide 25 and a tooth carrier 27 which are attached together, as by screws 29. A pinion gear 30 is rotatably mounted upon the support 28 and engages the rack 26.

A worm gear assembly 15 may be substituted for the rack and pinion assembly 14, and is shown in Figures 6 through 8. In this assembly, a worm gear 100 is coupled to the driving shaft 42 of the differential gear mechanism through the electromagnetic clutch 16, and is meshed with a worm gear wheel 102. The wheel 102 is attached to a sleeve 106 which is rotatably mounted upon a housing 104 by means of ball bearings 107. The sleeve 106 is provided with threads 109 upon its inner surface. The worm gear 100 is also rotatably mounted upon the housing 104 by means of ball bearings 108. The control rod 10 is threaded into threads 109 on the sleeve 106 and is provided with a longitudinal groove 111. Attached to the housing 104 is a guide plate 110 which is provided with an extended tooth 112 which is slidably disposed within the groove 111 of the control rod 10 to prevent it from rotating. Hence rotation of the worm gear 100 is effective to turn the sleeve 106 with respect to the control rod 10, thereby changing the position of the control rod 10 relative to the housing 104 of the worm gear assembly 15.

The details of the differential gear mechanism 18 are shown in Figures 2, 3 and 4. Power is applied to the differential gear mechanism 18 through a driven shaft 32 which is coupled at one end to the motor 12 through the universal joint 22. Power is also applied to the differential gear mechanism 18 through a sleeve 34 which is rotatably disposed about a portion of the driven shaft 32. A first driving gear 36 is attached at the other end of the driven shaft 32 and the adjacent end of the sleeve 34 is provided with a second driving gear 38. Both of the gears 36 and 38 are rigidly secured to the shaft 32 and the sleeve 34, respectively, and are disposed within a gear box 40. The sleeve 34 is journaled in bearings 39 through one of the walls of the gear box 40, and the driven shaft 32 terminates in a bearing 41 on the opposite wall of the gear box 40. A driving shaft 42 is also journaled through the gear box 40 in bearings 43, and is rotatably disposed parallel to the driven shaft 32. A differential gear shaft 44 is securely mounted to the driving shaft 42 at a point centrally between the first and second driven gears 36 and 38 and is normal to the driving shaft 42. A set of beveled gears 46 and 48 are rotatably mounted upon opposite ends of the differential gear shaft 42. A second set of beveled gears 50 and 52 are rotatably mounted about the driving shaft 42 and meshed with the first set of beveled gears 46 and 48. The first driven gear 36 is meshed to a first coupling gear 54 which is affixed to one of the second set of beveled gears 50 and rotatable with it about the driving shaft 42. The other beveled gear 52 of the second set of beveled gears is securely attached to a second coupling gear 56 which is also rotatable with the beveled gear 52 about the driving shaft 42. An idler gear 58 is rotatably mounted upon the gear box 40 by means of a shaft 57 and meshed with the second driven gear 38 and the second coupling gear 56, so that the second coupling gear 56 rotates in the same direction as the second driven gear 38.

As stated above, the differential gear mechanism 18 is coupled to the motor 12 through the second electromagnetic clutch 20. The second electromagnetic clutch 20 has a non-magnetic core 59 journaled within and rotatable with respect to a magnetic body 60. The non-magnetic core 59 is provided with an aperture 62 into which the sleeve 34 of the gear mechanism 18 is securely wedged. Windings 64 disposed adjacent to the magnetic body 60 are connected to collector rings 66 disposed about the periphery of the magnetic body 60. The collector rings 66 are insulated from the magnetic body 60 by an insulating strip 68. The non-magnetic core 59 is also rotatably journaled about the driven shaft 32 on ball bearings 69 mounted at a point adjacent to the end of the sleeve 34. Brush contacts 70 mounted upon the mounting platform 24 make electrical contact with the collector rings 66. The non-magnetic core 59 is provided with a recess 71 at one end into which a magnetic disc 76 is loosely disposed. A braking disc 72 is secured to the driven shaft 32 by a hub 73 at a point confronting the non-magnetic core 59. A cap 74 securely attached to the periphery of the magnetic disc 76 extends over the braking disc 72, thereby disposing the braking disc 72 between the cap 74 and the non-magnetic core 59. A shaft support 78 is mounted upon the mounting platform 24 and supports the portion of the shaft 32 which extends from the gear mechanism 18.

A similar brake structure is mounted on the other end of the electromagnetic clutch 20 to lock the sleeve 34 to the mounting platform 24 when the windings 64 are not energized. This brake mechanism has a brake cage 80 which is cylindrical in shape and is provided with three friction discs 82 secured to its inner periphery and spaced from each other. The brake cage 80 is securely mounted upon the mounting platform 24, as shown in Figure 1. Between the friction discs 82 a pair of cooperating friction discs 84 are disposed, these latter discs 84 being securely attached to the magnetic body 60 of the clutch 20. A flange 86 is secured to the end of the non-magnetic core 59, and mounts a spring 88. A floating brake shoe 90 is disposed between the flange 86 and the brake cage 80, and contacts the friction discs 82. The brake shoe 90 is maintained in contact with the friction discs 82 by the tension placed thereon by the spring 88. A pin 92 is slidably disposed through the magnetic body 60 from the brake shoe 90 to a point adjacent to the magnetic disc 76.

When the windings 64 of the clutch 20 are not energized, the spring 88 places sufficient tension on the brake shoe 90 to force the friction discs 82 and 84 into contact, thus locking the brake cage 80 to the magnetic body 60 of the clutch 20. In this manner, the sleeve 34 is effectively clamped to the mounting platform 24. When the windings 64 of the clutch 20 are energized, the magnetic disc 76 will be attracted to the magnetic body 60, thus clamping the braking disc 72 between the cap 74 and the non-magnetic core 59. The magnetic disc 76 will also be forced against the pin 92, and drive the pin 92 against the brake shoe 90, thus releasing the tension placed upon the friction discs 82 and 84 and setting the magnetic body 60 free to rotate relative to the mounting platform 24. Thus, energizing the windings 64 has had the effect of unclamping the sleeve 34 from the mounting platform 24 and also locking the shaft 32 to the sleeve 34.

The first electromagnetic clutch 16 is similar in construction to the second electromagnetic clutch 20, described above, except that the braking disc 72 and hub 73 are removed. Hence, the only braking action occurs at the friction discs 82 and 84 locking the shaft 42 to the mounting platform when the windings 64 of the clutch 20 are not energized.

When power is applied to the motor 12, and simultaneously to the first electromagnetic clutch 16, the rotational motion created by the motor 12 will be transmitted through the universal joint 22, the differential gear mechanism 18, the first electromagnetic clutch 16 and the rack and pinion assembly 14, or the worm gear assembly 15, to the control or safety element 10 within the neutronic reactor 11. Whether the element 10 is further inserted into the reactor or withdrawn therefrom is controlled by the second electromagnetic clutch 20 and the difference in the gear ratios of the coupling gears 54 and 56 to the gear 36 and gear 38, respectively. This difference in gear ratios causes the coupling gears 54 and 56 to revolve at slightly different rates, and the gear ratio of gear 38 to coupling gear 56 has been made greater than that of gear 36 to coupling gear 54 to cause the coupling gear 56 to rotate at a faster rate than the coupling gear 54 when the driven shaft 32 and sleeve 34 are clamped together. As a result, the driving shaft 42 rotates at a slow rate equal to the difference in rotation rates of gears 54 and 56, and in the same direction as the sleeve 34 and driven shaft 32. In other words, the gear ratio between the driven shaft 32 and the beveled gear 50 of the differential gear mechanism 18 is greater than the gear ratio between the sleeve 34 and the beveled gear 52 of the differential gear mechanism, the term gear ratio being used to indicate the number of revolutions of the driving gear for each revolution of the driven gear. The sleeve 34 and driven shaft 32 are only clamped together by the clutch 20 when the windings 64 of the clutch 20 are energized, thus producing the operation of the differential gear mechanism 18 described above. However, when the windings 64 of the clutch 20 are not energized, the sleeve 34 is coupled to the mounting platform 24 by the second electromagnetic clutch 20, thereby arresting the motion of the sleeve 34. In this condition, the coupling gear 56 is also prevented from rotating, and the direction of rotation of the shaft 42 is determined by the direction of rotation of the coupling gear 54 alone. Since this direction of rotation of the coupling gear 54 will be opposite to that of the driven gear 36, the shaft 42 will also rotate in the direction opposite to the driven shaft 32. In this manner, arresting rotation of the sleeve 34 by coupling it to the mounting platform 24 is effective to reverse the direction of rotation of the driving shaft 42.

It is thus clear, that this particular choice of gear ratios makes the device particularly adapted for use in positioning safety rods within a neutronic reactor. A safety rod is not used to control the periodic variations in the neutron density level within a reactor, but only to prevent the reaction from exceeding a value which may be readily controlled by control rods positioned within the reactor for this purpose. The safety rods are normally positioned within the active portion of the reactor before the chain reaction is allowed to begin, and then the safety rods are slowly withdrawn to a point at which the control rods are able to maintain control of the reaction. However, if the reaction should become excessive, the control rods may lose control of the reaction and it will be necessary to reinsert the safety rods further into the active portion of the reactor. It may be necessary to accomplish this step rapidly in order to prevent an explosive reaction from developing. The positioning device described will permit the slow withdrawal of the safety rod from the active portion of the reactor in order to allow the control elements of the reactor to gain control of the reaction. It also will permit the rapid insertion of these safety rods further into the reactor if it becomes necessary to prevent an explosive reaction.

The rack and pinion drive mechanism 14 has particular utility for this type of operation, although the worm gear mechanism 15 may also be used. The worm gear mechanism 15, however, has particular utility for accurately positioning control elements, and hence will generally be used with a control rod rather than a safety rod. If the positioning device described above is used to position a control rod, the driven shaft 32 and the sleeve 34 must be permanently locked together, thereby providing a device in which the driving shaft 42 will at all times rotate at a rate equal to the difference in the rotation rates of the coupling gears 54 and 56. Also, it will be necessary to use a reversible motor for the motor 12, or some other means to reverse the rotation of the shaft 32 in order to position the control rod in either of the two permissible directions of motion.

The man skilled in the art will readily devise many other devices and modifications of the present device within the intended scope of the invention. Hence, the scope of the invention should be construed in the light of the appended claim, rather than the specific embodiments described.

What is claimed is:

A positioning mechanism comprising, in combination; a differential gear mechanism including a housing, a driving shaft journaled within the housing, a driven shaft journaled within the housing parallel to the driving shaft, a sleeve rotatably disposed about the driven shaft, a first driven gear affixed to the driven shaft, a second driven gear affixed to the sleeve, a first coupling gear rotatably disposed about the driving shaft and coupled to the first driven gear on the driven shaft, a second coupling gear rotatably disposed about the driving shaft, an idler gear meshed with the second coupling gear and the second driven gear, the gear ratio of the second drive gear to the second coupling gear being greater than that of the first driven gear to the first coupling gear, a differential gear shaft affixed to the driving shaft and extending normally therethrough, a first pair of beveled gears rotatably mounted on the differential gear shaft, and a second set of beveled gears attached to the coupling gears and meshed with the first pair of beveled gears; and driving means connected to the driven shaft for rotating said shaft including a clutch mechanism having one position locking the shaft to the sleeve and a second position locking the sleeve to the housing.

References Cited in the file of this patent

UNITED STATES PATENTS

| Number | Name | Date |
|---|---|---|
| 1,953,151 | Cahill | Apr. 3, 1934 |
| 2,267,114 | Lear et al. | Dec. 23, 1941 |
| 2,495,312 | Bickel | Jan. 24, 1950 |

FOREIGN PATENTS

| Number | Country | Date |
|---|---|---|
| 371,292 | France | Mar. 4, 1907 |
| 540,565 | Germany | Dec. 31, 1931 |
| 104,488 | Australia | July 21, 1938 |